United States Patent
Lowe et al.

(10) Patent No.: US 7,568,231 B1
(45) Date of Patent: Jul. 28, 2009

(54) INTEGRATED FIREWALL/VIRUS SCANNER SYSTEM, METHOD, AND COMPUTER PROGRAM PRODUCT

(75) Inventors: Joseph C. Lowe, Aloha, OR (US); Jonathan L. Edwards, Portland, OR (US); Srin N. Kumar, Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 818 days.

(21) Appl. No.: 10/876,522

(22) Filed: Jun. 24, 2004

(51) Int. Cl.
*G06F 11/30* (2006.01)
(52) U.S. Cl. ...................................................... 726/24
(58) Field of Classification Search .................. 726/11, 726/24
See application file for complete search history.

(56) References Cited

U.S. PATENT DOCUMENTS

| | | | |
|---|---|---|---|
| 6,119,236 A * | 9/2000 | Shipley | 726/22 |
| 6,928,555 B1 * | 8/2005 | Drew | 713/188 |
| 6,931,540 B1 * | 8/2005 | Edwards et al. | 713/188 |
| 2003/0110258 A1 * | 6/2003 | Wolff et al. | 709/225 |
| 2003/0115479 A1 * | 6/2003 | Edwards et al. | 713/200 |
| 2003/0145228 A1 * | 7/2003 | Suuronen et al. | 713/201 |
| 2003/0177383 A1 * | 9/2003 | Ofek et al. | 713/200 |
| 2003/0196103 A1 * | 10/2003 | Edwards et al. | 713/200 |
| 2003/0204632 A1 * | 10/2003 | Willebeek-LeMair et al. | 709/249 |
| 2004/0088570 A1 * | 5/2004 | Roberts et al. | 713/201 |
| 2005/0004886 A1 * | 1/2005 | Stahl et al. | 707/1 |
| 2005/0055708 A1 * | 3/2005 | Gould et al. | 725/25 |

FOREIGN PATENT DOCUMENTS

WO       03/054723       3/2003

OTHER PUBLICATIONS

Douglas E. Comer. Internetworking with TCP/IP Principles, Protocols, and Architectures. 2000. Prentice Hall. 4$^{th}$ Edition. p. 226.*
"Symantec™ Gateway Security 5400 Series: Reference Guide" © 1998-2003 Symantec Corporation.

* cited by examiner

*Primary Examiner*—Christian LaForgia
(74) *Attorney, Agent, or Firm*—Zilka-Kotab, PC (57) ABSTRACT

A security system, method and computer program product are provided. In use, a request from a remote computer to write to a file on a local computer is identified. It is then determined whether the request results in the local computer being infected with malware. If it is determined that the request results in the local computer being infected with malware, communications between the remote computer and the local computer are blocked.

16 Claims, 5 Drawing Sheets

INTEGRATED FIREWALL/VIRUS SCANNER SYSTEM, METHOD, AND COMPUTER PROGRAM PRODUCT

FIELD OF THE INVENTION

The present invention relates to network security, and more particularly to preventing malware from infecting computers.

BACKGROUND OF THE INVENTION

In the space of just a few years, the Internet, because it provides access to information, and the ability to publish information, in revolutionary ways, has emerged from relative obscurity to international prominence. Whereas, in general, an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Security threats have evolved significantly with the increased popularity of the Internet. Advanced hybrid threats have been designed to attack systems on multiple fronts, sometimes searching for vulnerabilities until one is found. New threats also attempt to attack security technology itself.

For example, one class of viruses is known as "share-hopping worms" (e.g. W32/Nimda, etc.). On an infected unprotected computer, the virus may search the network for writable shares on other computers. When it finds one, the virus may infect all the executable files it can find in that share.

While traditional virus scanners are capable of detecting when a file becomes infected and removing the infection, such traditional virus scanners typically react to each and every infection. For example, if a computer has a writable share with 100 executable files, the virus would infect them, and the virus scanner would detect and clean every one.

Unfortunately, this places an unnecessary load on the computer and on the network. There is thus a need for overcoming these and other related security problems.

SUMMARY OF THE INVENTION

A security system, method and computer program product are provided. In use, a request from a remote computer to write to a file on a local computer is identified. It is then determined whether the request results in the local computer being infected with malware. If it is determined that the request results in the local computer being infected with malware, communications between the remote computer and the local computer are blocked.

In one embodiment, the request may be carried out utilizing a common Internet file system (CIFS) protocol. Still yet, the request may be decoded for obtaining information about the remote computer. By virtue of such decoding, an Internet Protocol (IP) address associated with the remote computer may be identified. Optionally, such IP address may be logged. In use, the blocking may be carried out utilizing the IP address. As still yet an additional option, a notice may be sent from the local computer to the remote computer regarding the malware.

In another embodiment, it may be determined whether the file is written. If it is determined that the file is written, the file may be scanned to determine if the file is infected with malware. If it is determined that the file is infected with malware, a response may be carried out. For example, the response may include cleaning the file.

Still yet, if it is determined that the file is infected with malware, communications may be initiated between a firewall and a virus scanner for blocking the communications between the remote computer and the local computer, utilizing the firewall. Such communications between the firewall and the virus scanner may include an IP address of the remote computer and instructions for blocking the communications between the remote computer and the local computer.

Such blocking may include dropping packets received at the local computer from the remote computer. Moreover, such packet dropping may result in the remote computer waiting until the cessation of an associated network driver timeout, before resending another request, thus further enhancing security.

DETAILED DESCRIPTION

Figure 1:
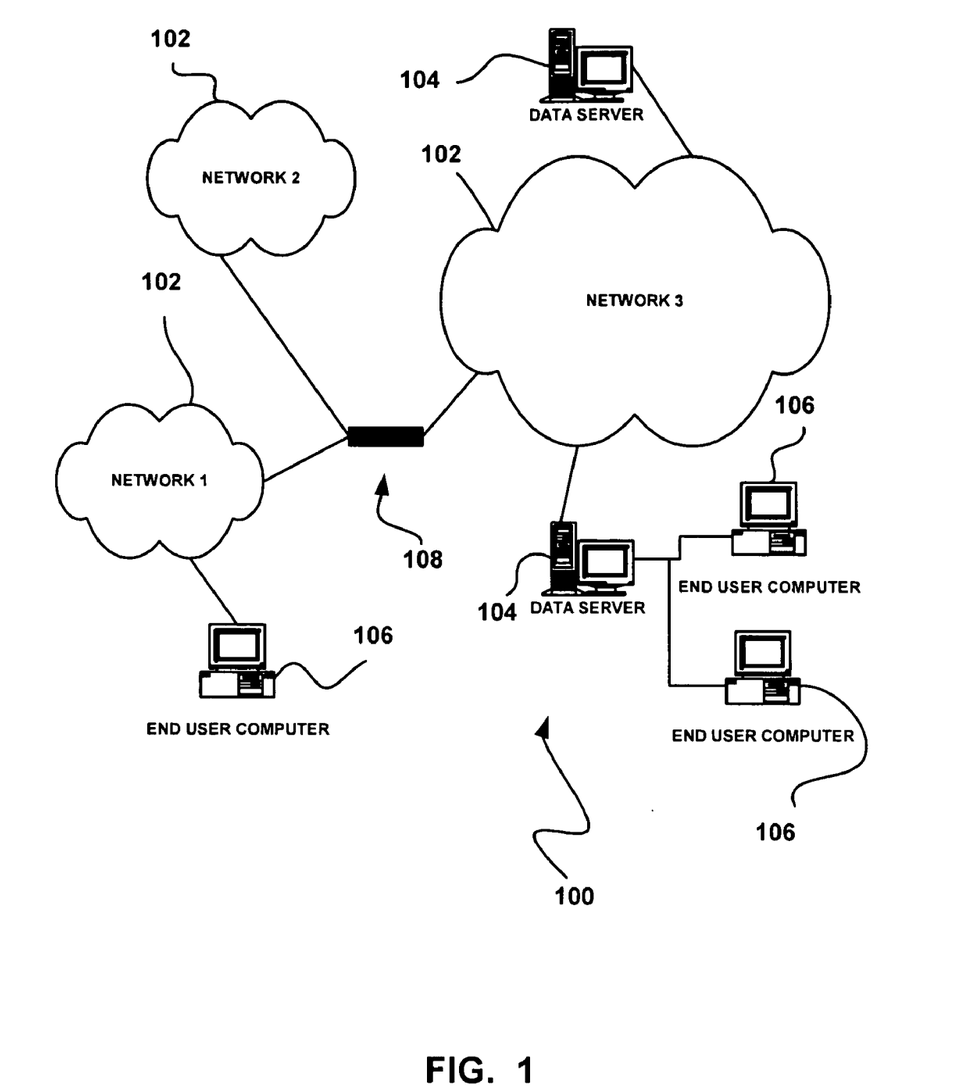
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween.

It should be noted that each of the foregoing network devices in the present network architecture 100, as well as any other unillustrated hardware and/or software, may be equipped with various security features. For example, the various data server computers 104 and/or end user computers 106 may be equipped with a virus scanner and/or a firewall, for purposes that will be set forth hereinafter in greater detail.

In use, a request is identified from a remote computer (i.e. one or more of the data server computers 104 and/or end user computers 106, etc.) to write to a file on a local computer (i.e. one or more of the data server computers 104 and/or end user computers 106, etc.). It is then determined whether the request results in the local computer being infected with malware.

In the context of the present description, malware (i.e. "malicious software") may refer to any programming or files that are developed for the purpose of doing harm to a computer and/or network components. Thus, malware may include, but is not limited to, computer viruses, worms, Trojan horses, etc. If it is determined that the request results in the local computer being infected with malware, communications between the remote computer and the local computer are blocked.

To this end, further infection is inhibited, at least in part. More information regarding optional functionality and architectural features will now be set forth for illustrative purposes.

Figure 2:
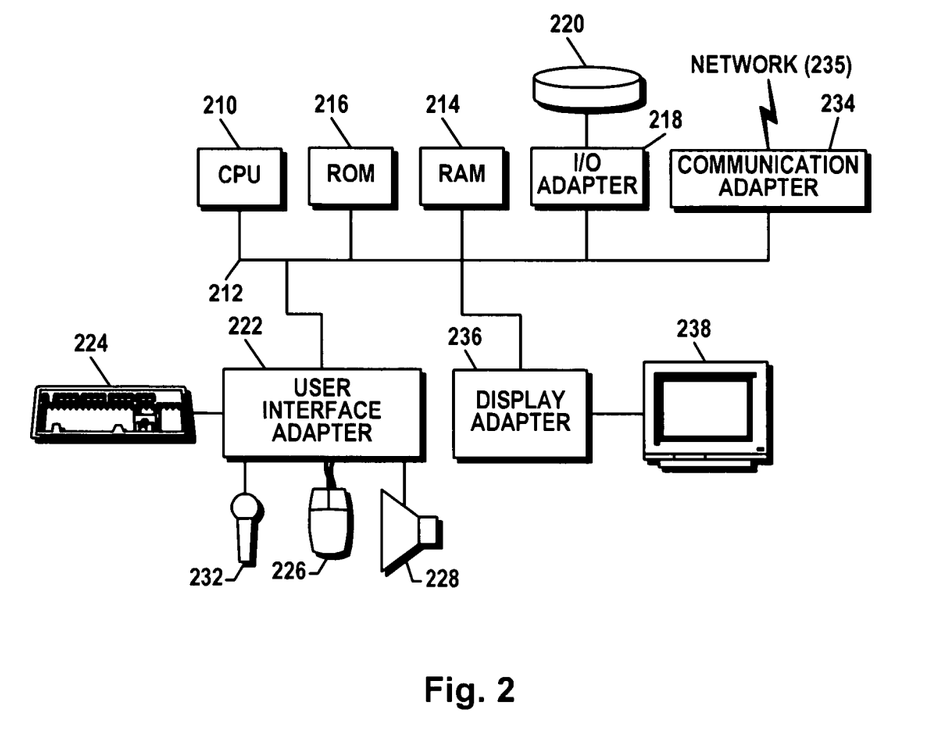
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA™, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
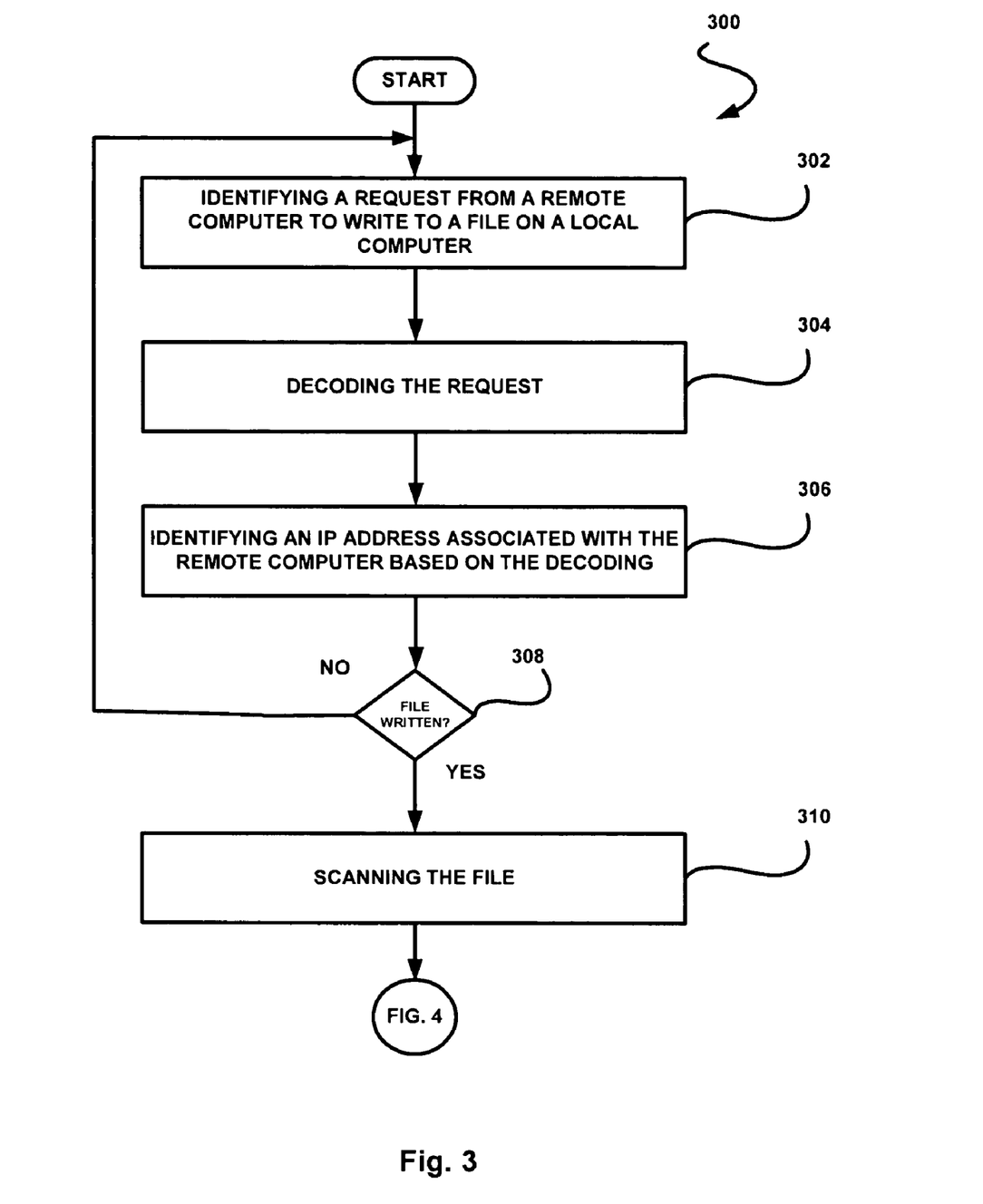
FIGS. 3 and 4 illustrate a method for blocking communications from an infected host, in accordance with one embodiment.
Figure 4:
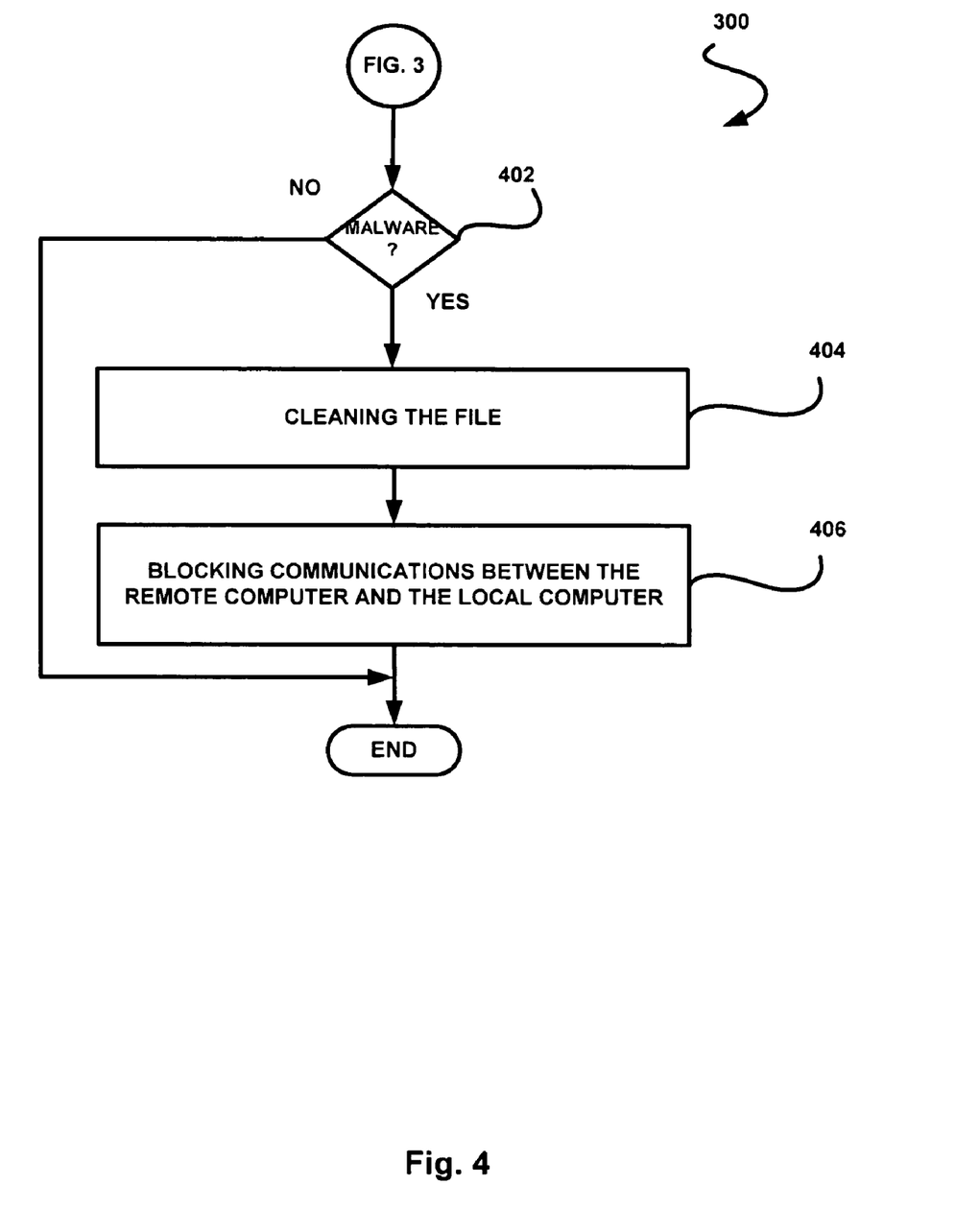

FIGS. 3 and 4 illustrate a method 300 for blocking communications from an infected host, in accordance with one embodiment. As an option, the present method 300 may be implemented in the context of the architecture and environment of FIGS. 1 and/or 2. Of course, however, the method 300 may be carried out in any desired environment.

In operation 302, a request is identified. Such request may arrive from a remote computer (i.e. see, for example, one or more of the data server computers 104, the end user computers 106, and/or another remote computer, etc.) to write to a file on a local computer (i.e. see, for example, one or more of the data server computers 104, the end user computers 106, and/or another local computer, etc.).

In one embodiment, the request may be identified utilizing a firewall associated with the local computer. Moreover, in the context of the present description, such request to write to the file may include any attempt by the remote computer to modify any sort of data existing on the local computer.

Optionally, in one embodiment, the request may be carried out utilizing a common Internet file system (CIFS) protocol.

CIFS is a standard protocol that lets programs make requests for files and services on other computers on the Internet. CIFS uses the client/server programming model. A client program makes a request of a server program (usually in another computer) for access to a file or to pass a message to a program that runs in the server computer. The server takes the requested action and returns a response. CIFS is a public or open variation of the server message block protocol developed and used by Microsoft®. The SMB protocol is widely used in local area networks for server file access. Like the SMB protocol, CIFS runs at a higher level than and uses the Internet TCP/IP protocol. CIFS is viewed as a complement to the existing Internet application protocols such as the file transfer protocol (FTP) and the hypertext transfer protocol (HTTP).

Next, in operation 304, the request is decoded for obtaining information about the remote computer. For example, an Internet Protocol (IP) address associated with the remote computer may be identified, in operation 306, based on the decoding. Optionally, such IP address may be logged. In one embodiment, operations 304 and 306 may be carried out utilizing the firewall associated with the local computer. Of course, however, each of the various operations described herein may be carried and distributed among any desired hardware and/or software.

It is then determined whether the file is written, in decision 308. Again, in the context of the present description, "written" may refer to any modification, alteration, creation, etc. of any aspect of data. If it is determined, in decision 308, that the file is written, the file is scanned in operation 310. Otherwise, the method 300 restarts. In the present context, such scanning may refer to any analysis that results in a determination whether malware exists.

With reference now to decision 402 of FIG. 4, it is then determined whether the request resulted in the local computer being infected with malware, based on the scanning. If it is determined that the request did not result in the local computer being infected with malware, the method 300 may be terminated. On the other hand, if it is determined that the request resulted in the local computer being infected with malware, various responses may follow. As an option, for example, the file may be cleaned (i.e. the malware removed, etc.). See operation 404. While not shown, various other responses may include quarantining, notices, etc.

As an option, operations 308-404 may be carried out utilizing a virus scanner associated with the local computer. Again, however, each of the various operations described herein may be carried out and distributed among any desired hardware and/or software.

In any case, in operation 406, communications between the remote computer and the local computer are blocked. For example, the remote computer may be prevented from accessing the local computer, utilizing the firewall. This may be accomplished by communication being initiated between the firewall and the virus scanner, once the malware is detected in decision 402. For instance, such communications between the firewall and the virus scanner may include the IP address of the remote computer and instructions for blocking communications between the remote computer and the local computer. As an additional option, a notice may be sent from the local computer to the remote computer regarding the malware.

The aforementioned blocking may include dropping packets received at the local computer from the remote computer. Moreover, such packet dropping may result in the remote computer waiting until the cessation of an associated network driver timeout, before resending another request, thus further enhancing security.

In one optional embodiment, a virus scanner and firewall may be included in a single software package for carrying out the foregoing functionality. In use, a device driver associated with the software package may intercept and examine network traffic and accesses to files through a share. This may be accomplished by decoding CIFS messages in order to associate file accesses with IP addresses.

When the virus scanner detects a virus, the virus scanner may request the firewall for information about the file. If the file was infected over the network, the firewall will have seen the CIFS communications and it will inform the virus scanner of the IP address of the remote computer that infected the file. The virus scanner may then instruct the firewall to block such IP address from accessing the computer in any future instances.

Figure 5:
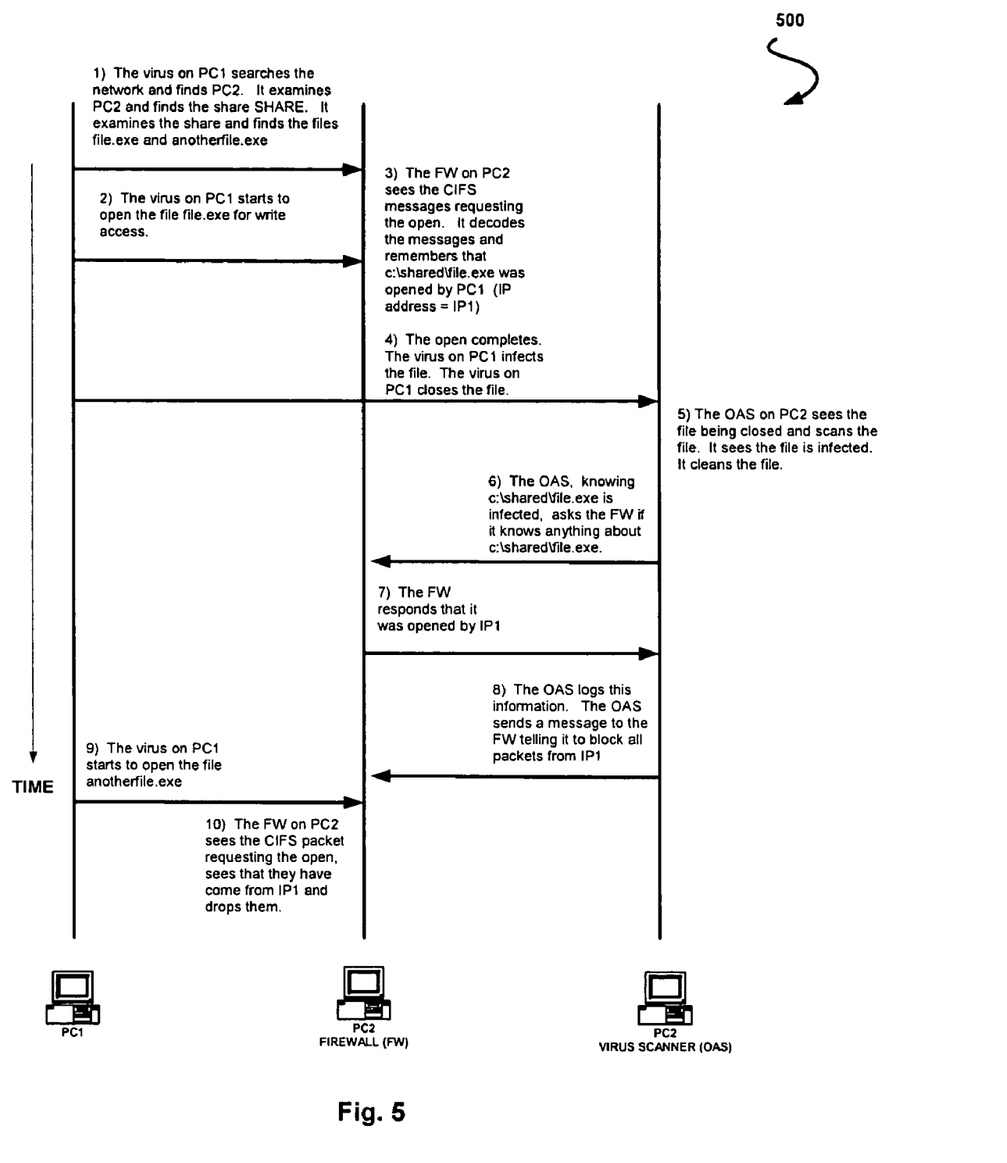
FIG. 5 illustrates an example of operation, in accordance with one embodiment.

FIG. 5 illustrates an example of operation 500, in accordance with one embodiment. It should be noted that such exemplary operation is set forth for illustrative purposes only, and should not be construed as limiting in any manner.

To facilitate review of the following example, the following legend is provided in Table 1.

TABLE 1

| | |
|---|---|
| PC1 | unprotected remote computer where a virus is running |
| IP1 | IP address of PC1 |
| PC2 | protected local computer where virus scanner/firewall are running. This local computer has files called c:\shared\file.exe and c:\shared\anotherfile.exe. The directory c:\shared is shared as a 'SHARE.' |
| VSE | single software package with firewall and virus scanner |
| OAS | virus scanner |
| FW | firewall |

In use, in operation 1), the virus on PC1 searches the network and finds PC2. The virus examines PC2 and finds the share SHARE. It examines the share and finds the files file.exe and anotherfile.exe.

In operation 2), the virus on PC1 starts to open the file file.exe for write access. In operation 3), the FW on PC2 sees the CIFS messages requesting the open. The FW decodes the messages and remembers that c:\shared\file.exe was opened by PC1 (IP address=IP1). Next, in operation 4), the open completes. As a result, the virus on PC1 infects the file. The virus on PC1 then closes the file.

The OAS on PC2 sees the file being closed and scans the file. See operation 5). The OAS on PC2 also sees that the file is infected. In response, the OAS on PC2 optionally cleans the file. In operation 6), the OAS, knowing that c:\shared\file.exe is infected, asks the FW if it knows anything about c:\shared\file.exe.

In operation 7), the FW responds that it was opened by IP1. The OAS logs this information. The OAS further sends a message to the FW telling it to block all packets from IP1, in operation 8). By this design, when the virus on PC1 starts to open the file anotherfile.exe [in operation 9)], the FW on PC2 sees the CIFS packet requesting the open, and sees that they have come from IP1 and drops them. See operation 10).

It should be noted that the foregoing exemplary order is not the only possible sequence of events. For example, operation 7) may be rolled into operation 5) and the OAS may actually be informed of IP1 whether or not the file is found to be infected.

By this functionality, only one file (or at least a minimal amount of files) is infected and cleaned. This reduces the load on the server and on the network. Still yet, the IP address of the remote computer that infected the file may operationally be logged. This allows the owner of PC2 to, for example, contact the owner of PC1 and inform him of the problem.

One possible side effect of the FW dropping the packets is that the virus on PC1 has to wait until the associated network driver performs a timeout and tells the virus that the open of the second file failed. On MS Windows®, this timeout may be as long as two minutes. Thus, a virus that is capable of infecting many files per second is, in an environment protected by one embodiment of the foregoing security functionality, now crippled into infecting one file every two minutes, possibly.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by sub-national groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm, or worse.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A security method, comprising:
   identifying a request from a remote computer to write to a file on a local computer;
   determining whether the request results in the local computer being infected with malware;
   blocking communications between the remote computer and the local computer if it is determined that the request results in the local computer being infected with malware;
   wherein, if it is determined that the file is infected with malware, communicating between a firewall and a virus scanner for blocking the communications between the remote computer and the local computer, utilizing the firewall;
   wherein an IP address of the remote computer is utilized for blocking the communications between the remote computer and the local computer as a result of the determination that the file is infected with malware;
   wherein the blocking includes dropping packets received at the local computer from the remote computer;
   wherein the packet dropping results in the remote computer waiting until the cessation of an associated network driver timeout before resending another request, thus further enhancing security.

2. The method as recited in claim 1, wherein the request is carried out utilizing a common Internet file system (CIFS) protocol.

3. The method as recited in claim 1, and further comprising decoding the request for obtaining information about the remote computer.

4. The method as recited in claim 3, wherein the decoding is performed utilizing the firewall.

5. The method as recited in claim 1, wherein the IP address is logged.

6. The method as recited in claim 1, wherein a notice is sent from the local computer to the remote computer regarding the malware.

7. The method as recited in claim 1, and further comprising determining whether the file is written.

8. The method as recited in claim 7, wherein, if it is determined that the file is written, scanning the file to determine if the file is infected with malware.

9. The method as recited in claim 8, wherein, if it is determined that the file is infected with malware, carrying out a response.

10. The method as recited in claim 9, wherein the response includes cleaning the file.

11. The method as recited in claim 1, wherein the security method is utilized to counter terrorism by preventing infection of cyber-frameworks with malware initiated by terrorists.

12. A security computer program product embodied on a computer readable medium, comprising:
computer code for identifying a request from a remote computer to write to a file on a local computer;
computer code for determining whether the request results in the local computer being infected with malware;
computer code for blocking communications between the remote computer and the local computer if it is determined that the request results in the local computer being infected with malware;
wherein, if it is determined that the file is infected with malware, communicating between a firewall and a virus scanner for blocking the communications between the remote computer and the local computer, utilizing the firewall;
wherein an IP address of the remote computer is utilized for blocking the communications between the remote computer and the local computer as a result of the determination that the file is infected with malware;
wherein the blocking includes dropping packets received at the local computer from the remote computer;
wherein the packet dropping results in the remote computer waiting until the cessation of an associated network driver timeout before resending another request, thus further enhancing security.

13. A security system, comprising:
a virus scanner adapted for determining whether a request from a remote computer to write to a file on a local computer results in the local computer being infected with malware;
a firewall in communication with the virus scanner, the firewall adapted for blocking communications between the remote computer and the local computer if it is determined that the request results in the local computer being infected with malware;
wherein, if it is determined that the file is infected with malware, communicating between the firewall and the virus scanner for blocking the communications between the remote computer and the local computer, utilizing the firewall;
wherein an IP address of the remote computer is utilized for blocking the communications between the remote computer and the local computer as a result of the determination that the file is infected with malware;
wherein the blocking includes dropping packets received at the local computer from the remote computer;
wherein the packet dropping results in the remote computer waiting until the cessation of an associated network driver timeout before resending another request, thus further enhancing security.

14. A security system, comprising:
means for identifying a request from a remote computer to write to a file on a local computer;
means for determining whether the request results in the local computer being infected with malware;
means for blocking communications between the remote computer and the local computer if it is determined that the request results in the local computer being infected with malware;
wherein, if it is determined that the file is infected with malware, communicating between a firewall and a virus scanner for blocking the communications between the remote computer and the local computer, utilizing the firewall;
wherein an IP address of the remote computer is utilized for blocking the communications between the remote computer and the local computer as a result of the determination that the file is infected with malware;
wherein the blocking includes dropping packets received at the local computer from the remote computer;
wherein the packet dropping results in the remote computer waiting until the cessation of an associated network driver timeout before resending another request, thus further enhancing security.

15. A security method, comprising:
identifying a request from a remote computer to write to a file on a local computer, utilizing a firewall, wherein the request is carried out utilizing a common Internet file system (CIFS) protocol;
decoding the request, utilizing the firewall;
identifying an IP address associated with the remote computer based on the decoding, utilizing the firewall;
determining whether the file is written, utilizing a virus scanner;
if it is determined that the file is written, scanning the file to determine if the file is infected with malware, utilizing the virus scanner;
if it is determined that the file is infected with malware:
cleaning the file, utilizing the virus scanner, and
communicating between the firewall and the virus scanner for blocking communications between the remote computer and the local computer, utilizing the firewall;
wherein the IP address of the remote computer is utilized for blocking the communications between the remote computer and the local computer as a result of the determination that the file is infected with malware;
wherein the blocking includes dropping packets received at the local computer from the remote computer;
wherein the packet dropping results in the remote computer waiting until the cessation of an associated network driver timeout before resending another request, thus further enhancing security.

16. A security method, comprising:

identifying a request from a remote computer to write to a file on a local computer;

determining whether the file is infected with malware;

blocking communications between the remote computer and the local computer if it is determined that the file is infected with malware;

wherein, if it is determined that the file is infected with malware, a firewall and a virus scanner communicate for blocking the communications between the remote computer and the local computer, utilizing the firewall;

wherein an IP address of the remote computer is utilized for blocking the communications between the remote computer and the local computer, as a result of the determination that the file is infected with malware;

wherein the blocking includes dropping packets received at the local computer from the remote computer;

wherein the packet dropping results in the remote computer waiting until the cessation of an associated network driver timeout before resending another request, thus further enhancing security.

\* \* \* \* \*